(12) United States Patent
Kosoy et al.

(10) Patent No.: US 9,922,447 B2
(45) Date of Patent: Mar. 20, 2018

(54) 3D REGISTRATION OF A PLURALITY OF 3D MODELS

(71) Applicant: MANTISVISION LTD., Petach Tikva (IL)

(72) Inventors: Vadim Kosoy, Petach Tikva (IL); Dani Daniel, Haifa (IL); Yotam Livny, Gadera (IL)

(73) Assignee: MANTIS VISION LTD., Petach Tikva (IL)

( * ) Notice: Subject to any disclaimer, the term of this patent is extended or adjusted under 35 U.S.C. 154(b) by 0 days.

(21) Appl. No.: 14/786,976

(22) PCT Filed: Apr. 30, 2014

(86) PCT No.: PCT/IL2014/050390
§ 371 (c)(1),
(2) Date: Oct. 25, 2015

(87) PCT Pub. No.: WO2014/178050
PCT Pub. Date: Nov. 6, 2014

(65) Prior Publication Data
US 2016/0110913 A1   Apr. 21, 2016

Related U.S. Application Data

(60) Provisional application No. 61/817,492, filed on Apr. 30, 2013.

(51) Int. Cl.
*G06K 9/00* (2006.01)
*G06T 15/20* (2011.01)
(Continued)

(52) U.S. Cl.
CPC ............ *G06T 15/20* (2013.01); *G06T 3/0068* (2013.01); *G06T 7/30* (2017.01); *G06T 7/344* (2017.01);
(Continued)

(58) Field of Classification Search
CPC ....... G06T 15/20; G06T 17/00; G06T 3/0068; G06T 7/30; G06T 7/344;
(Continued)

(56) References Cited

U.S. PATENT DOCUMENTS 5,909,476 A * 6/1999 Cheng ................... G06T 11/006
378/4
8,442,304 B2 * 5/2013 Marrion ............ G06K 9/00214
382/154

(Continued)

*Primary Examiner* — Mekonen Bekele
(74) *Attorney, Agent, or Firm* — Vladimir Sherman; Professional Patent Solutions Ltd.

(57) ABSTRACT

A technique for 3D registration of three or more 3D models using parallel computing. The technique treats the pairwise 3D registration problem as an atomic sub-problem, and solves in parallel a plurality of pairwise 3D registration. The initial guess for the pairwise 3D registration is calculated based on the, possibly incomplete, information available at the moment the calculation is made. At each point the available pairwise transformations are examined based on current available information. Transformations that are identified as outliers or as inaccurate are marked for repeated pairwise 3D registration when additional information relevant for the calculation of the initial guess becomes available.

26 Claims, 6 Drawing Sheets

(51) Int. Cl.
*G06T 17/00* (2006.01)
*G06T 3/00* (2006.01)
*H04N 13/02* (2006.01)
*G06T 7/30* (2017.01)
*G06T 7/33* (2017.01)

(52) U.S. Cl.
CPC ......... *G06T 17/00* (2013.01); *H04N 13/0275* (2013.01); *G06T 2207/10028* (2013.01); *G06T 2207/20016* (2013.01); *G06T 2207/30241* (2013.01); *G06T 2210/56* (2013.01)

(58) Field of Classification Search
CPC . G06T 2207/10028; G06T 2207/20016; G06T 2207/30241; G06T 2210/56; H04N 13/0275

USPC .................. 32/132, 131, 128, 107, 130, 154
See application file for complete search history.

(56) References Cited

U.S. PATENT DOCUMENTS

| | | | |
|---|---|---|---|
| 9,332,243 B2* | 5/2016 | Klusza | H04N 13/0207 |
| 2008/0146919 A1* | 6/2008 | Camus | A61B 6/5247 600/437 |
| 2009/0080604 A1* | 3/2009 | Shores | A61B 6/032 378/37 |
| 2010/0135544 A1* | 6/2010 | Mattiuzzi | G06T 7/269 382/128 |
| 2011/0028843 A1* | 2/2011 | Hyun | G06T 7/38 600/443 |
| 2011/0181589 A1* | 7/2011 | Quan | G06T 17/05 345/420 |
| 2012/0120072 A1* | 5/2012 | Se | G01C 11/06 345/420 |
| 2013/0009950 A1* | 1/2013 | Ben-David | G06T 15/04 345/419 |
| 2016/0101572 A1* | 4/2016 | Schouwenburg | B33Y 80/00 602/5 |
| 2016/0321838 A1* | 11/2016 | Barone | H04N 1/00827 |

* cited by examiner

3D REGISTRATION OF A PLURALITY OF 3D MODELS

TECHNOLOGICAL FIELD

The invention relates to 3D processing and to 3D registration, and more specifically to 3D registration of three or more 3D models.

RELATED ART

The following references are provided as examples of the known art relating to the present invention. The following listing is not intended to comprise a comprehensive list of all relevant art. The entire contents of all references listed in the present specification, including the following documents, are incorporated herein by reference.

Chalermwat, P., El-Ghazawi, T., & LeMoigne, J. (2001). "2-phase GA-based image registration on parallel clusters." Future Generation Computer Systems, 17(4), 467-476.

Rohde, G. K., Aldroubi, A., & Dawant, B. M. (2003). "The adaptive bases algorithm for intensity-based nonrigid image registration". Medical Imaging, IEEE Transactions on, 22(11), 1470-1479.

Ino, F., Ooyama, K., & Hagihara, K. (2005). "A data distributed parallel algorithm for nonrigid image registration". Parallel Computing, 31(1), 19-43.

Rohlfing, T., & Maurer Jr, C. R. (2003). "Nonrigid image registration in shared-memory multiprocessor environments with application to brains, breasts, and bees." Information Technology in Biomedicine, IEEE Transactions on, 7(1), 16-25.

Christensen, G. E. (1998). "MIMD vs. SIMD parallel processing: A case study in 3D medical image registration". Parallel Computing, 24(9), 1369-1383.

Ourselin, S., Stefanescu, R., & Pennec, X. (2002). "Robust registration of multi-modal images: towards real-time clinical applications." In Medical Image Computing and Computer-Assisted Intervention—MICCAI 2002 (pp. 140-147). Springer Berlin Heidelberg.

Warfield, S. K., Jolesz, F. A., & Kikinis, R. (1998). "A high performance computing approach to the registration of medical imaging data." Parallel Computing, 24(9), 1345-1368.

Wachowiak, M. P., & Peters, T. M. (2004). "Parallel optimization approaches for medical image registration." In Medical Image Computing and Computer-Assisted Intervention—MICCAI 2004 (pp. 781-788). Springer Berlin Heidelberg.

Qiu, D., May, S., & Nüchter, A. (2009). "GPU-accelerated nearest neighbor search for 3D registration." In Computer Vision Systems (pp. 194-203). Springer Berlin Heidelberg.

Robertson, C., & Fisher, R. B. (2002). "Parallel evolutionary registration of range data." Computer Vision and Image Understanding, 87(1), 39-50.

Shams, R., Sadeghi, P., Kennedy, R., & Hartley, R. (2010). "Parallel computation of mutual information on the GPU with application to real-time registration of 3D medical images." Computer methods and programs in biomedicine, 99(2), 133-146.

Jost, T., & Hugli, H. (2003, October). "A multi-resolution ICP with heuristic closest point search for fast and robust 3D registration of range images." In 3-D Digital Imaging and Modeling, 2003. 3DIM 2003. Proceedings. Fourth International Conference on (pp. 427-433). IEEE.

Saxena, V., Rohrer, J., & Gong, L. (2010). "A parallel GPU algorithm for mutual information based 3D nonrigid image registration." In Euro-Par 2010-Parallel Processing (pp. 223-234). Springer Berlin Heidelberg.

Xu, L., & Wan, J. W. (2008). "Real-time intensity-based rigid 2D-3D medical image registration using rapidmind multi-core development platform." In Engineering in Medicine and Biology Society, 2008. EMBS 2008. 30th Annual International Conference of the IEEE (pp. 5382-5385). IEEE.

SUMMARY

The present disclosure relates to a method of 3D registration for a plurality of 3D models. In an example of the presently disclosed subject matter, the 3D registration method includes using parallel computing. Further by way of example, several (two, three, . . . , n) 3D registration computations for two 3D models (3D model pairs) can be carried out in parallel, or several (two, three, . . . , n) 3D registration computations for subgroups of the plurality of 3D models (subgroups of 3D models) can be carried out in parallel.

According to examples of the presently disclosed subject matter, the method of 3D registration for a plurality of 3D models can include interpolating a trajectory based on past and future information, as will be further explained below. In this regard, it would be appreciated that preforming several registration computations, each for a different subgroup of 3D models, in parallel to flow of information is different compared to that which typically occurs in a sequential processing method.

Typically, in a sequential processing, when performing 3D registration computations for a given subgroup of 3D models, information resulting from 3D registration of previously processed subgroups is available. The information resulting from 3D registration of previously processed subgroups can be used, for example, both in the selection of a next subgroup to be processed, and in generating the initial guess for the pairwise 3D registration process, or for the 3D registration process of the subgroup. Take for example a trajectory scenario, where the 3D models arise from tracking an object moving along a trajectory relative to a single 3D camera. In a sequential processing setting, pairs of sequential 3D models can be processed in the order of their generation, starting from the first two 3D models to be generated, continuing with the second and third 3D models, and so forth. In such a case, the results of previous 3D registrations can be used to extrapolate an estimation of the trajectory, therefore producing an initial guess for the next pair of 3D models.

According to examples of the presently disclosed subject matter, the parallel processing of subgroups of 3D models can occur before all or some of the information that would typically be available in a sequential approach is ready. According to examples of the presently disclosed subject matter, the processing of a subgroup of 3D models can start with an initial guess, which could be suboptimal. Thus, the parallel processing of subgroups of 3D models according to examples of the presently disclosed subject matter can include an evaluation of results of the ongoing 3D registration process, and based on predefined repeat registration criteria, a repeated 3D registration of a certain subgroup of 3D models that was already processed can be invoked. Still further by way of example, as part of a repetition of 3D registration of a certain subgroup of 3D models, obtain additional information that was collected since the previous 3D registration of the subgroup of 3D models that is subject to the repeated 3D registration and so is now available for the repeated 3D registration of that subgroup, can be used to improve the result. It would be noted that in some circumstances, the repeated 3D registration can have more or better information compared to what would have been available in the sequential approach.

For example, in a trajectory scenario such as that which mentioned above, when it is determined based on the predefined repeat registration criteria that a 3D registration of a certain subgroup of 3D models needs to be repeated, results for the 3D registration of "future" subgroups (in the order set forth by the trajectory) could already be available, and such information can be used in the repeated registration, for example, to interpolate the trajectory based on both past and future information.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Unless specifically stated otherwise, as apparent from the following discussions, it is appreciated that throughout the specification discussions utilizing terms such as "processing", "calculating", "computing", "determining", "generating", "applying", "obtaining", or the like, include action and/or processes of a computer that manipulate and/or transform data into other data, said data represented as physical quantities, e.g. such as electronic quantities, and/or said data representing the physical objects. The terms "computer", "processor", "controller", "processing unit", and "computing unit" should be expansively construed to cover any kind of electronic device, component or unit with data processing capabilities, including, by way of non-limiting example, a personal computer, a tablet, a smartphone, a server, a computing system, a communication device, a processor (for example, digital signal processor (DSP), and possibly with embedded memory), a microcontroller, a field programmable gate array (FPGA), an application specific integrated circuit (ASIC), a graphics processing unit (GPU), and so on), a core within a processor, any other electronic computing device, and or any combination thereof.

The operations in accordance with the teachings herein may be performed by a computer specially constructed for the desired purposes or by a general purpose computer specially configured for the desired purpose by a computer program stored in a computer readable storage medium, e.g., in a non-transitory computer readable storage medium such a memory unit.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase one case", some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

In embodiments of the presently disclosed subject matter one or more stages illustrated in the figures may be executed in a different order and/or one or more groups of stages may be executed simultaneously and vice versa. The figures illustrate a general schematic of the system architecture in accordance with an embodiment of the presently disclosed subject matter. A module, a unit a component or the like in the figures can be made up of any combination of software, hardware and/or firmware that performs the functions as defined and explained herein. The modules, units, components or the like in the figures may be centralized in one location or dispersed over more than one location.

Provided below is a list of terms and definitions. As stated below, some of the terms define below have a conventional meaning in the field of image processing or in the field of video processing or in the field of 3D processing. For each of the terms below a short definition is provided. For terms which have a conventional meaning in the art, the following definitions are provided as a non-limiting example only for convenience purposes. Accordingly, the interpretation of the corresponding terms in the claims, unless stated otherwise, is not limited to the definitions below, and the terms used in the claims should be given their broadest reasonable interpretation.

The term "3D model" is recognized by those skilled in the art and refers to any kind of digital representation of any 3D surface, 3D object, 3D scene, 3D prototype, 3D shape, 3D design and so forth, either static or moving. A 3D model can be represented in a computer in different ways. Some examples of 3D model representations include a range image, where one associates a depth for pixels of a regular 2D image. Another example of a 3D model representation is a point cloud, where the 3D model consists of a set of 3D points. A different example is a representation using polygons, where the model consists of a set of polygons. Special types of polygon based models include: (i) polygon soup, where the polygons are unsorted; (ii) mesh, where the polygons are connected to create a continuous surface; (iii) subdivision surface, where a sequence of meshes is used to approximate a smooth surface; (iv) parametric surface, where a set of formulas are used to describe a surface; (v) implicit surface, where one or more equations are used to describe a surface; (vi) and so forth. Another example is to represent a 3D model as a skeleton model, where a graph of curves with radii is used. Additional examples include a mixture of any of the above method. There are also variants on the above methods, as well as a variety of other methods. It would be noted that one may convert one kind of representation to another, possibly with some information lose. In other cases, conversion from one representation to another may require making some assumptions to complete missing information.

The term "computational task" is recognized by those skilled in the art and refers to a group of computational steps or blocks that can be executed by a computer. Some examples of computational tasks include computer-executable instructions, source code instructions, algorithms, computer functions, computer procedures, computer subroutines, and so forth.

As utilized herein, the term "3D-models-subgroup" means any group of two or more (three, four, ..., n) 3D models selected out of a group of a plurality of 3D models.

The term "3D registration problem" is recognized by those skilled in the art and refers to the problem of finding one or more spatial transformations that aligns two or more 3D models, and/or for transforming two or more 3D models into a single coordinate system.

The term "3D registration algorithm" is recognized by those skilled in the art and refers to any process, algorithm, method, procedure, and/or technique, for solving and/or approximating one or more solutions to the 3D registration problem. Some examples of 3D registration algorithms include the Iterative Closest Point algorithm, the Robust Point Matching algorithm, the Kernel Correlation algorithm, the Coherent Point Drift algorithm, RANSAC based algorithms, any graph and/or hypergraph matching algorithm, any one of the many variant of these algorithms, and so forth.

The term "3D registration result" is recognized by those skilled in the art and refers to the product of a 3D registration algorithm. A 3D registration result can be in the form of: spatial transformations between pairs of 3D models; spatial transformations for transforming all the 3D models into a single coordinate system; representation of all the 3D models in a single coordinate system; and so forth.

The term "global 3D registration result" is recognized by those skilled in the art and refers to a 3D registration result for the entire group of 3D models. For example, when discussing a specific group of 3D models, a 3D registration result may deal with only a subgroup of the discussed group, while global 3D registration result must deal with all the 3D models in the discussed group.

The term "consistent global 3D registration result" is recognized by those skilled in the art and refers to a global 3D registration result that does not contain any inconsistencies, and can represent a plausible arrangement of the 3D models in real world. Examples of possible inconsistencies include the case where the 3D registration result, directly or indirectly, assigns to a single object two or more different locations, assigns to a single object two or more different orientations, assigns two or more different lengths to the same distance, assigns two or more different areas to the same polygon, and so on.

As utilized herein, the term "relaxation" means a process, algorithm, method, procedure, and/or technique for taking a global 3D registration result that may contain inconsistencies, or a group of 3D registration result that may conflict with each other, and produces a consistent global 3D registration result.

As utilized herein, the term "3D models sequence data" means any kind of information that defines and/or specifies a unique sequence of a plurality of 3D models. Examples of such 3D models sequence data can include: time stamps for each 3D model, which defines a temporal order of the plurality of 3D model; real world locations for the 3D models, which defines a spatial order of the plurality of 3D models; and so forth.

As utilized herein, the term "sequential 3D models" with respect to a given 3D models sequence data, means two or more 3D models that are adjacent according to the 3D models sequence data.

The term "parallel 3D registration algorithm" is recognized by those skilled in the art and refers to any 3D registration algorithm that performs a plurality of calculations simultaneously, by dividing a 3D registration problem into several sub-problems, and solving the sub-problems concurrently.

The term "3D camera" is recognized by those skilled in the art and refers to any type of device, including a camera and/or a sensor, which is capable of capturing 3D images, 3D videos, and/or 3D models. Examples include: stereoscopic cameras, time-of-flight cameras, obstructed light 3D cameras, structured light 3D camera, and so forth. It would be noted by those versed in the art that active 3D camera usually include one or more imaging sensors, a projector (e.g., a structured light projector), a driver and a processor that is capable of decoding an image that was captured by the imaging sensor to extract depth information.

It should be noted that some examples of the presently disclosed subject matter are not limited in application to the details of construction and the arrangement of the components set forth in the following description or illustrated in the drawings. The invention can be capable of other embodiments or of being practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing has the same use and description as in the previous drawings. Similarly, an element that is identified in the text by a numeral that does not appear in the drawing described by the text, has the same use and description as in the previous drawings where it was described.

The drawings in this document may not be to any scale. Different figures may use different scales and different scales can be used even within the same drawing, for example different scales for different views of the same object or different scales for the two adjacent objects.

Figure 1:
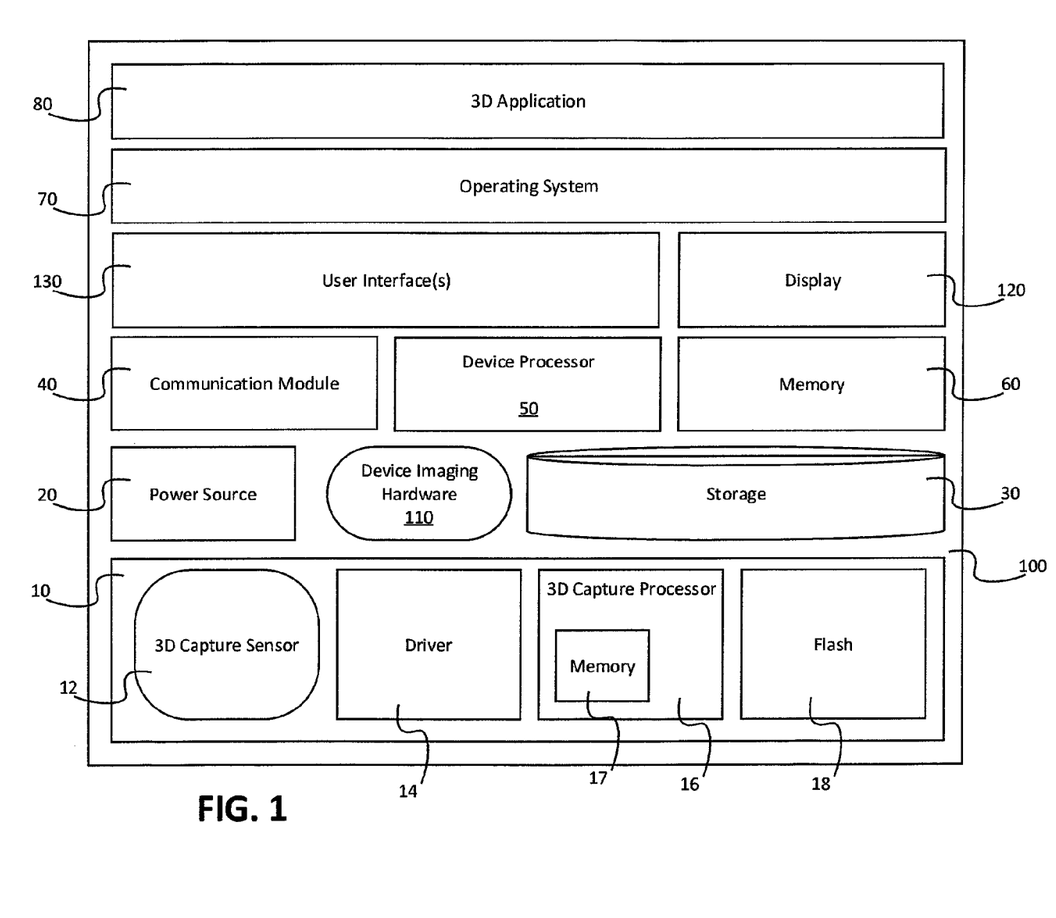
FIG. 1 is a simplified block diagram of an example for one possible implementation of a mobile communication device with 3D capturing capabilities.

FIG. 1 is a simplified block diagram of an example for one possible implementation of a mobile communication device with 3D capturing capabilities. The mobile communication device 100 can includes a 3D camera 10 that is capable of providing 3D depth or range data. In the example of FIG. 1 there is shown a configuration of an active stereo 3D camera, but in further examples of the presently disclosed subject matter other known 3D cameras can be used. Those versed in the art can readily apply the teachings provided in the examples of the presently disclosed subject matter to other 3D camera configurations and to other 3D capture technologies.

By way of example, the 3D camera 10 can include: a 3D capture sensor 12, a driver 14, a 3D capture processor 16 and a flash module 18. In this example, the flash module 18 is configured to project a structured light pattern and the 3D capture sensor 12 is configured to capture an image which corresponds to the reflected pattern, as reflected from the environment onto which the pattern was projected. U.S. Pat. No. 8,090,194 to Gordon et. al. describes an example structured light pattern that can be used in a flash component of a 3D camera, as well as other aspects of active stereo 3D capture technology and is hereby incorporated into the present application in its entirety. International Application Publication No. WO2013/144952 describes an example of a possible flash design and is hereby incorporated by reference in its entirety.

By way of example, the flash module 18 can include an IR light source, such that it is capable of projecting IR radiation or light, and the 3D capture sensor 12 can be and IR sensor, that is sensitive to radiation in the IR band, and such that it is capable of capturing the IR radiation that is returned from the scene. The flash module 18 and the 3D capture sensor 12 are calibrated. According to examples of the presently disclosed subject matter, the driver 14, the 3D capture processor 16 or any other suitable component of the mobile communication device 100 can be configured to implement auto-calibration for maintaining the calibration among the flash module 18 and the 3D capture sensor 12.

The 3D capture processor 16 can be configured to perform various processing functions, and to run computer program code which is related to the operation of one or more components of the 3D camera. The 3D capture processor 16 can include memory 17 which is capable of storing the computer program instructions that are executed or which are to be executed by the processor 16.

The driver 14 can be configured to implement a computer program which operates or controls certain functions, features or operations that the components of the 3D camera 10 are capable of carrying out.

According to examples of the presently disclosed subject matter, the mobile communication device 100 can also include hardware components in addition to the 3D camera 10, including for example, a power source 20, storage 30, a communication module 40, a device processor 50 and memory 60, device imaging hardware 110, a display unit 120, and other user interfaces 130. It should be noted that in some examples of the presently disclosed subject matter, one or more components of the mobile communication device 100 can be implemented as distributed components. In such examples, a certain component can include two or more units distributed across two or more interconnected nodes. Further by way of example, a computer program, possibly executed by the device processor 50, can be capable of controlling the distributed component and can be capable of operating the resources on each of the two or more interconnected nodes.

It is known to use various types of power sources in a mobile communication device. The power source 20 can include one or more power source units, such as a battery, a short-term high current source (such as a capacitor), a trickle-charger, etc.

The device processor 50 can include one or more processing modules which are capable of processing software programs. The processing module can each have one or more processors. In this description, the device processor 50 may include different types of processors which are implemented in the mobile communication device 100, such as a main processor, an application processor, etc. The device processor 50 or any of the processors which are generally referred to herein as being included in the device processor can have one or more cores, internal memory or a cache unit.

The storage unit 30 can be configured to store computer program code that is necessary for carrying out the operations or functions of the mobile communication device 100 and any of its components. The storage unit 30 can also be configured to store one or more applications, including 3D applications 80, which can be executed on the mobile communication device 100. In a distributed configuration one or more 3D applications 80 can be stored on a remote computerized device, and can be consumed by the mobile communication device 100 as a service. In addition or as an alternative to application program code, the storage unit 30 can be configured to store data, including for example 3D data that is provided by the 3D camera 10.

The communication module 40 can be configured to enable data communication to and from the mobile communication device. By way of example, examples of communication protocols which can be supported by the communication module 40 include, but are not limited to cellular communication (3G, 4G, etc.), wired communication protocols (such as Local Area Networking (LAN)), and wireless communication protocols, such as Wi-Fi, wireless personal area networking (PAN) such as Bluetooth, etc.

It should be noted that that according to some examples of the presently disclosed subject matter, some of the components of the 3D camera 10 can be implemented on the mobile communication hardware resources. For example, instead of having a dedicated 3D capture processor 16, the device processor 50 can be used. Still further by way of example, the mobile communication device 100 can include more than one processor and more than one type of processor, e.g., one or more digital signal processors (DSP), one or more graphical processing units (GPU), etc., and the 3D camera can be configured to use a specific one (or a specific set or type) processor(s) from the plurality of device 100 processors.

The mobile communication device 100 can be configured to run an operating system 70. Examples of mobile device operating systems include but are not limited to: such as Windows Mobile™ by Microsoft Corporation of Redmond, Wash., and the Android operating system developed by Google Inc. of Mountain View, Calif.

The 3D application 80 can be any application which uses 3D data. Examples of 3D applications include a virtual tape measure, 3D video, 3D snapshot, 3D modeling, etc. It would be appreciated that different 3D applications can have different requirements and features. A 3D application 80 may be assigned to or can be associated with a 3D application group. In some examples, the device 100 can be capable of running a plurality of 3D applications 80 in parallel.

Imaging hardware 110 can include any imaging sensor, in a particular example, an imaging sensor that is capable of capturing visible light images can be used. According to examples of the presently disclosed subject matter, the imaging hardware 110 can include a sensor, typically a sensor that is sensitive at least to visible light, and possibly also a light source (such as one or more LEDs) for enabling image capture in low visible light conditions. According to examples of the presently disclosed subject matter, the device imaging hardware 110 or some components thereof can be calibrated to the 3D camera 10, and in particular to the 3D capture sensor 12 and to the flash 18. It would be appreciated that such a calibration can enable texturing of the 3D image and various other co-processing operations as will be known to those versed in the art.

In yet another example, the imaging hardware 110 can include a RGB-IR sensor that is used for capturing visible light images and for capturing IR images. Still further by way of example, the RGB-IR sensor can serve as the 3D capture sensor 12 and as the visible light camera. In this configuration, the driver 14 and the flash 18 of the 3D camera, and possibly other components of the device 100, are configured to operate in cooperation with the imaging hardware 110, and in the example given above, with the RGB-IR sensor, to provide the 3D depth or range data.

The display unit 120 can be configured to provide images and graphical data, including a visual rendering of 3D data that was captured by the 3D camera 10, possibly after being processed using the 3D application 80. The user interfaces 130 can include various components which enable the user to interact with the mobile communication device 100, such as speakers, buttons, microphones, etc. The display unit 120 can be a touch sensitive display which also serves as a user interface.

According to some examples of the presently disclosed subject matter, any processing unit, including the 3D capture processor 16 or the device processor 50 and/or any sub-components or CPU cores, etc. of the 3D capture processor 16 and/or the device processor 50, can be configured to read 3D images and/or frames of 3D video clips stored in storage unit 30, and/or to receive 3D images and/or frames of 3D video clips from an external source, for example through communication module 40; produce 3D models out of said 3D images and/or frames. By way of example, the produced 3D models can be stored in storage unit 30, and/or sent to an external destination through communication module 40. According to further examples of the presently disclosed subject matter, any such processing unit can be configured to execute 3D registration on a plurality of 3D models.

Figure 2:
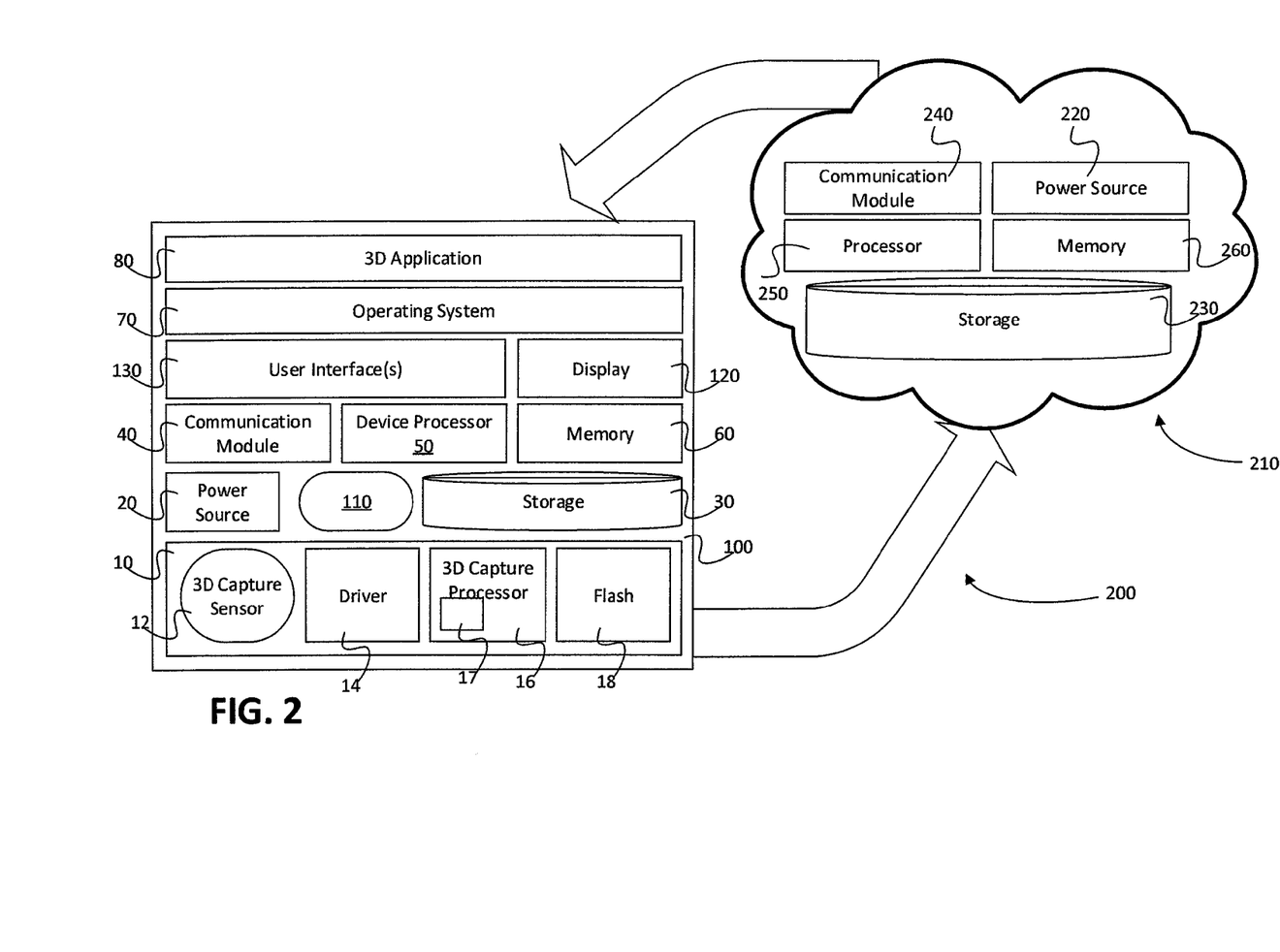
FIG. 2 is a simplified block diagram of an example for one possible implementation of a system that includes a mobile communication device with 3D capturing capabilities and a cloud platform.

FIG. 2 is a simplified block diagram of an example for one possible implementation of a system 200, that includes a mobile communication device with 3D capturing capabilities 100, and a could platform 210 which includes resources that allows the execution of 3D registration.

According to examples of the presently disclosed subject matter, the cloud platform 210 can include hardware components, including for example, one or more power sources 220, one or more storage units 230, one or more communication modules 240, one or more processors 250, optionally one or more memory units 260, and so forth.

The storage unit 230 can be configured to store computer program code that is necessary for carrying out the operations or functions of the cloud platform 210 and any of its components. The storage unit 230 can also be configured to store one or more applications, including 3D applications, which can be executed on the cloud platform 210. In addition or as an alternative to application program code, the storage unit 230 can be configured to store data, including for example 3D data.

The communication module 240 can be configured to enable data communication to and from the cloud platform. By way of example, examples of communication protocols which can be supported by the communication module 240 include, but are not limited to cellular communication (3G, 4G, etc.), wired communication protocols (such as Local Area Networking (LAN)), and wireless communication protocols, such as Wi-Fi, wireless personal area networking (PAN) such as Bluetooth, etc.

The one or more processors 250 can include one or more processing modules which are capable of processing software programs. The processing module can each have one or more processing units. In this description, the device processor 250 may include different types of processors which are implemented in the cloud platform 210, such as general purpose processing units, graphic processing units, physics processing units, etc. The device processor 250 or any of the processors which are generally referred to herein can have one or more cores, internal memory or a cache unit.

According to examples of the presently disclosed subject matter, the one or more memory units 260 may include several memory units. Each unit may be accessible by all of the one or more processors 250, or only by a subset of the one or more processors 250.

According to some examples of the presently disclosed subject matter, any processing unit, including the one or more processors 250 and/or any sub-components or CPU cores, etc. of the one or more processors 250, can be configured to read 3D images and/or frames of 3D video clips stored in storage unit 230, and/or to receive 3D images and/or frames of 3D video clips from an external source, for example through communication module 240, where, by a way of example, the communication module may be communicating with the mobile communication device 100, with another cloud platform, and so forth. By a way of example, the processing unit can be further configured to produce 3D models out of said 3D images and/or frames. Further by a way of example, the produced 3D models can be stored in storage unit 230, and/or sent to an external destination through communication module 240. According to further examples of the presently disclosed subject matter, any such processing unit can be configured to execute 3D registration on a plurality of 3D models.

According to further examples of the presently disclosed subject matter, a parallel 3D registration can be executed by the mobile communication device 100 and the could platform 210 together, for example where some computational tasks are executed on the mobile communication device 100, while other computational tasks are executed on the could platform 210. Further by a way of example, communication for controlling and/or synchronizing and/or transferring information among the computational tasks can be performed through communication between the communication module 40 and the one or more communication modules 240.

Figure 3:
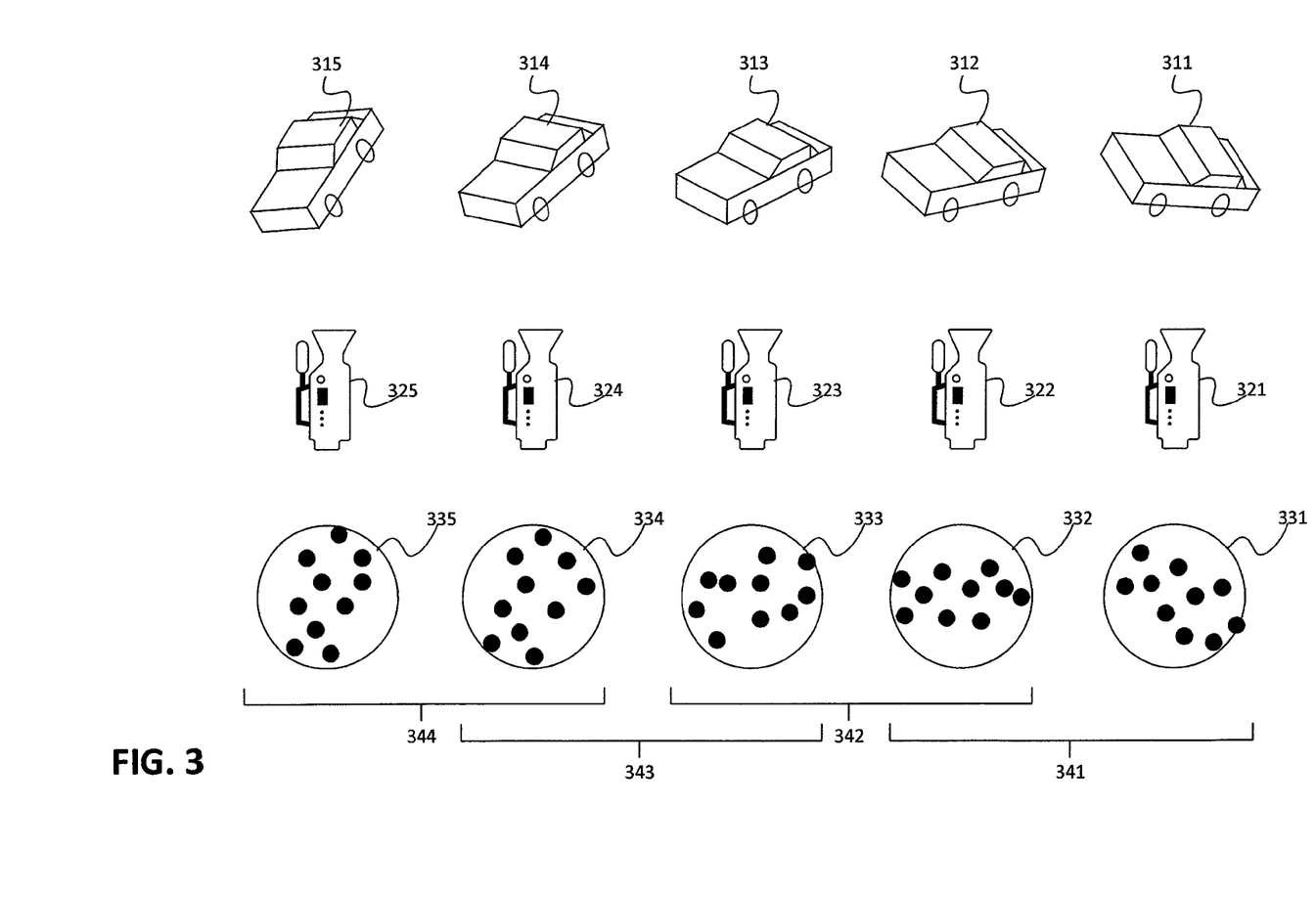
FIG. 3 is an illustration of a possible scenario in which a plurality of 3D models is generated by a single 3D camera.

FIG. 3 is an illustration of a possible scenario in which a plurality of 3D models is generated by a single 3D camera. A moving object is captured at five sequential points in time. We will denote the earliest point in time as T1, the second point in time as T2, the third as T3, the fourth as T4, and the fifth as T5. 311 is the object at T1, 312 is the object at T2, 313 is the object at T3, 314 is the object at T4, and 315 is the object at T5. 321 is the single 3D camera at time T1, which generates a 3D model 331 of the object at time T1 (311). Similarly, at time T2 the single 3D camera (322) generates the 3D model 332 of the object (312); at time T3 the single 3D camera (323) generates the 3D model 333 of the object (313); at time T4 the single 3D camera (324) generates the 3D model 334 of the object (314); at time T5 the single 3D camera (325) generates the 3D model 335 of the object (315).

According to some examples of the presently disclosed subject matter, sequential pairs of 3D models are selected: pair 341 consists of 3D models 331 and 332; pair 342 consists of 3D models 332 and 333; pair 343 consists of 3D models 333 and 334; pair 344 consists of 3D models 334 and 335.

According to further examples of the presently disclosed subject matter, the pairwise 3D registration of pairs 341, 342, 343, and 344 can be performed simultaneously in parallel by a plurality of computational units. Note that in sequential processing of the pairwise 3D registration of the four pairs, the result the pairwise 3D registration for pairs 341 and 342 would be available before starting the pairwise 3D registration of pair 343, and can therefore be used in the computation of an initial guess for the 3D registration of pair 343. Further by a way of example, in a parallel scheme, the pairwise 3D registration of the pair 343 can start before the completion of the pairwise 3D registration of pairs 341 and 342. Therefore, by a way of example, the initial guess for the pairwise 3D registration of pair 343 may be lacking due to missing information on the pairwise 3D registration of pairs 341 and 342. In such case, by a way of example, after the pairwise 3D registration of pairs 341 and 342, the initial guess and pairwise 3D registration result for pair 343 can be reevaluated, and in some cases can be assigned for a repeated pairwise 3D registration of the 343 pair. Further by a way of example, in a repeated pairwise 3D registration of pair 343, the result of the pairwise 3D registration for pair 344 may already be available. In such case, the initial guess for the repeated pairwise 3D registration of pair 343 can use information from the pairwise 3D registration of pair 344, which is not available at time of pairwise 3D registration of the pair 343 in a sequential processing. Further by a way of example, the initial guess and pairwise 3D registration result for pair 343 can also be reevaluated at time T5 when the 3D model 335 becomes available, and/or after the pairwise 3D registration of pair 344 is completed.

Figure 4:
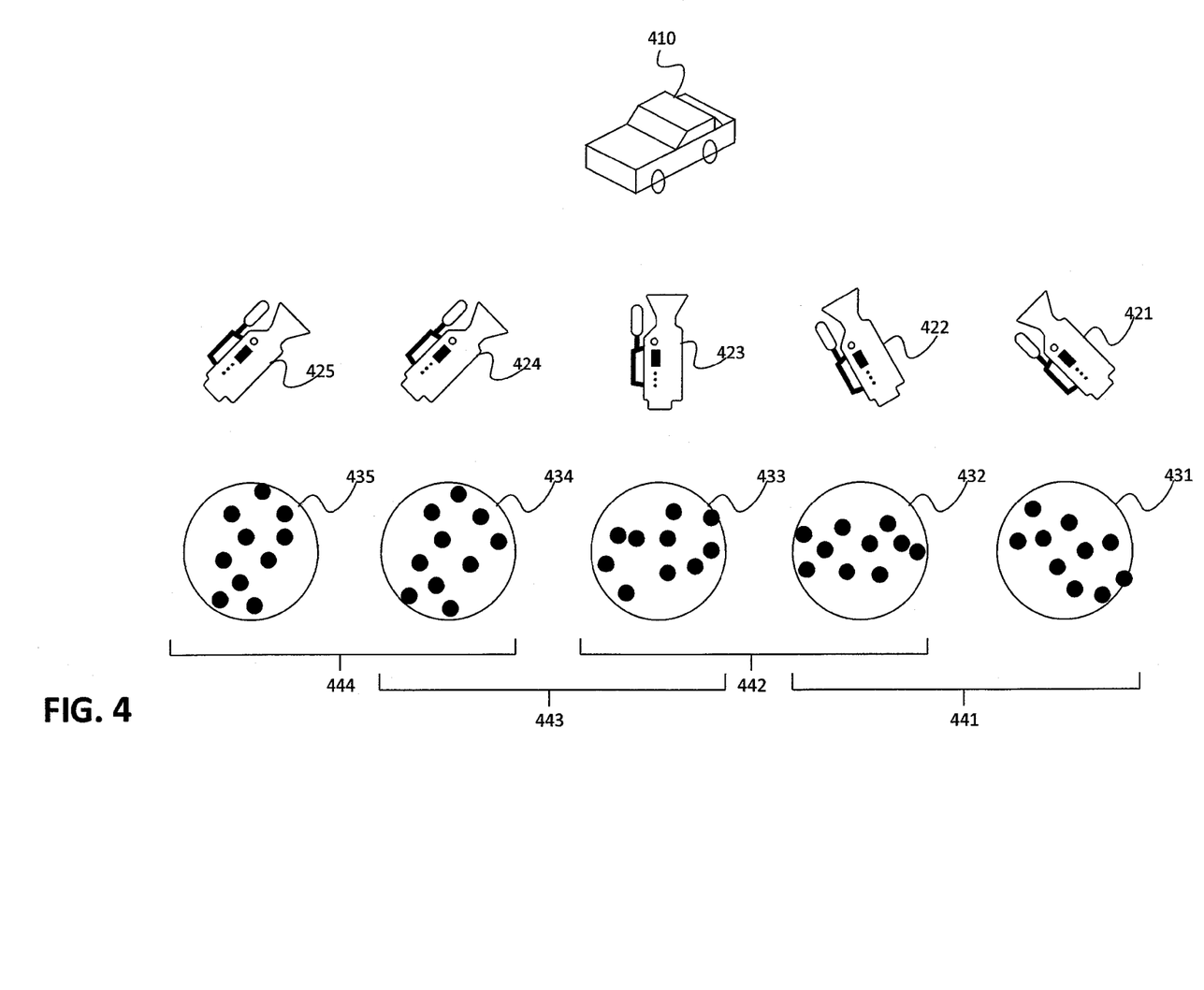
FIG. 4 is an illustration of a possible scenario in which a plurality of 3D models is generated by a plurality of 3D cameras.

FIG. 4 is an illustration of a possible scenario in which a plurality of 3D models is generated by a plurality of 3D cameras. A single object 410 is captured by five 3D cameras: 3D camera 421 generates the 3D model 431; 3D camera 422 generates the 3D model 432; 3D camera 423 generates the 3D model 433; 3D camera 424 generates the 3D model 434; and 3D camera 425 generates the 3D model 435.

According to some examples of the presently disclosed subject matter, spatially close 3D models are paired: pair 441 consists of 3D models 431 and 432; pair 442 consists of 3D models 432 and 433; pair 443 consists of 3D models 433 and 434; pair 444 consists of 3D models 434 and 435.

According to further examples of the presently disclosed subject matter, the pairwise 3D registration of pairs 441, 442, 443, and 444 can be performed simultaneously in parallel by a plurality of computational units. Assume for example that the priorities for scheduling the pairwise 3D registration of pairs 441, 442, 443, and 444 is to start with pair 441 first, continue with pair 442, followed by pair 443, and ending with pair 444. Note that in sequential processing of the pairwise 3D registration of the four pairs, the result the pairwise 3D registration for pairs 441 and 442 would be available before starting the pairwise 3D registration of pair 443, and can therefore be used in the computation of an initial guess for the 3D registration of pair 443. Further by a way of example, in a parallel scheme, the pairwise 3D registration of the pair 443 can start before the completion of the pairwise 3D registration of pairs 441 and 442. Therefore, by a way of example, the initial guess for the pairwise 3D registration of pair 443 may be lacking due to missing information on the pairwise 3D registration of pairs 441 and 442. In such case, by a way of example, after the pairwise 3D registration of pairs 441 and 442, the initial guess and pairwise 3D registration result for pair 443 can be reevaluated, and in some cases the pair 443 can be assigned for a repeated pairwise 3D registration. Further by a way of example, in a repeated pairwise 3D registration of pair 443, the result of the pairwise 3D registration for pair 444 may already be available. In such case, the initial guess for the repeated pairwise 3D registration of pair 443 can use information from the pairwise 3D registration of pair 444, which is not available at time of pairwise 3D registration of the pair 443 in a sequential processing. Further by a way of example, the initial guess and pairwise 3D registration result for pair 443 can also be reevaluated after the pairwise 3D registration of pair 444 is completed.

As is known by those versed in the art, 3D registration involves an attempt to align two or more 3D models, by finding or applying spatial transformations over the 3D models. 3D registration is useful in many imaging, graphical, image processing, computer vision, medical imaging, robotics, and pattern matching applications.

Examples of scenarios were 3D registration involves significant challenges include: a moving 3D camera, or multiple 3D cameras with different positions and directions and generating a plurality of 3D models of a static scene from different viewpoints. In these examples, the 3D registration process may involve recovering the relative positions and directions of the different viewpoints. Recovering the relative positions and directions of the different viewpoints can further enable merging of the plurality of 3D models into a single high quality 3D model of the scene. Alternatively, the recovered positions and directions can be used in a calibration process of a multiple 3D camera system, or to reconstruct the trajectory of a single moving camera.

Another scenario were 3D registration can present some challenges is where a static 3D camera is used to generate a series of 3D models of a moving object or scene. Here, the 3D registration process recovers the relative positions and orientations of the object or scene in each 3D model. Recovering the relative positions and orientations of the object or scene in each 3D model can further enables merging of the plurality of 3D models into a single high quality 3D model of the object or scene. Alternatively, the trajectory of the moving object or scene can be reconstructed.

A moving 3D camera, or multiple moving 3D cameras, capturing 3D images of a scene that may include several moving objects. As an example, consider one or more 3D cameras attached to a vehicle, where the vehicle is moving, the relative positions and orientations of the 3D cameras to the vehicle are changing, and objects in the scene are moving. In the above scenario, the 3D registration results can be used to assemble a map or a model of the environment, for example as input to motion segmentation algorithms, and so forth.

When the 3D registration process involves a pair of 3D models, the goal of the 3D registration process is to find a spatial transformation between the two models. This can include rigid and non-rigid transformations. When the 3D registration process involves three or more 3D models, a possible goal is to find a sufficient number of spatial transformations for pairs of 3D models in order to align the plurality of 3D models. It would be noted that the 3D registration process can sometimes benefit from a surplus number of transformations in order to improve the accuracy of the alignment. In such cases, it is beneficial to maintain consistency among the transformations, or to solve inconsistencies in a later stage.

It would be noted that a 3D registration process which involves multiple 3D models can be significantly different compared to a 3D registration of a single pair of 3D models. A 3D registration process which involves multiple 3D models can be time consuming, and performing it under a time constraint, especially in real-time, is challenging.

According to examples of the presently disclosed subject matter, a 3D registration process for a plurality of 3D models includes dividing the 3D registration process into smaller atomic sub-3D registration processes, as is discussed below, and wherein at least some of the 3D registration sub-processes are processed in parallel. According to examples of the presently disclosed subject matter, the division of the 3D registration process into smaller atomic 3D registration sub-processes is carried out in a manner which can reduce dependencies and communication among the 3D registration sub-process, as is discussed below. According to examples of the presently disclosed subject matter, a 3D registration sub-process includes a pairwise 3D registration of two 3D models, to be executed by a single processing unit. According to further examples of the presently disclosed subject matter, a 3D registration sub-process includes 3D registration of three or more 3D models, to be executed by a single processing unit.

According to examples of the presently disclosed subject matter, a single processing unit can receive as input (as part of a given 3D registration sub-process) a respective 3D models subgroup. In a further example, optionally, in association with the 3D models subgroup, the processing unit can receive (or obtain) an initial guess with respect to the 3D registration of the said subgroup. In a further example, the processing unit can execute a 3D registration algorithm on the said subgroup. According to examples of the presently disclosed subject matter, the output of the processing unit which is allocated for processing of the subgroup of 3D models can be a transformation between the two models.

It would be noted that according to examples of the presently disclosed subject matter, the atomic 3D registration sub-process can involve any number of 3D models, and can receive as input any subgroup of the plurality of 3D models, where the subgroup of 3D models that is associated with a 3D registration sub-process can include any number models that is smaller than the entire set of 3D models to be 3D registered. The processing unit may execute a 3D registration algorithm on the said subgroup of 3D models. The output of the 3D registration sub-process is the 3D registration result for the input subgroup of the plurality of 3D models. For readability and clarity, the following discussion shall focus on a pairwise atomic 3D registration sub-process, namely a pairwise 3D registration. However, unless otherwise specified, any discussion of a pairwise atomic 3D registration sub-process, also applies to the more general case of a 3D models subgroup 3D registration sub-process.

By way of example, the 3D registration sub-process can involve using any available 3D registration algorithm. For example, any of: the Iterative Closest Point algorithm, the Robust Point Matching algorithm, the Kernel Correlation algorithm, the Coherent Point Drift algorithm, or any variant of these algorithms can be used. Still further by way of example, for a subgroup of 3D models that includes more than two 3D models, the Multiple Graphs or Hypergraphs extension of the Probabilistic Graph and Hypergraph Matching algorithm can be used. Further by way of example, as another alternative, another implementation of the parallel 3d registration scheme for 3D registration of a plurality of 3D models presented here can be applied in order to solve the 3D registration sub-process in a recursive fashion. It would be noted that many other alternatives also exist. Note that different algorithms may be applied to solve different atomic sub-problems.

The presently disclosed subject matter is not limited to any particular setting or conditions under which the 3D models, which are processed as part of the 3D registration process, were produced. However, for convenience and by way of non-limiting illustration, the following discussion is made with reference to two example scenarios:

The first example scenario is where the plurality of 3D models have no inherent order. For example, consider multiple 3D cameras each generating a single 3D model, and no a priori knowledge on the position and orientation of the 3D cameras is available.

The second example scenario is where the plurality of 3D models have an inherent order. For example, consider a system of cameras where there is an a priori guess about the position and orientation of the cameras. As another example consider a single 3D camera and a moving object, where additional sensors, such as a GPS, a gyroscope, or an accelerometer are attached to the object, providing estimations on the motion of the object.

In the latter case, according to examples of the presently disclosed subject matter, the a priori estimation of the transformations among the 3D models can be used to prioritize the order in which the atomic 3D registration sub-processes are processed. In addition, and further by way of example, since a good initial guess can contribute to a correct and rapid convergence of many pairwise 3D registration algorithms (in comparison to the application of such algorithms with an erroneous guess), a priori knowledge about the motion or the trajectory can be used in the 3D registration process, in order to produce a good initial guess with regard to the transformations among the 3D models.

According to examples of the presently disclosed subject matter, the pairing of 3D models, or the selection of subgroups of the plurality of 3D models, can be done according to different criterions. For example, an exhaustive approach can be applied, taking any possible pairs and/or subgroups. As another example, a random sample of all possible pairs and/or subgroups can be selected. In addition, and further by way of example, in the case where the plurality of 3D models have an inherent order, this order can be used in the pairing and/or selection process, as an example, by preferring pairs and/or subgroups which are localized according to the said inherent order. For example, selecting any immediate neighboring pair and/or subgroup of 3D models. As another example, given a higher probability for pairs and/or subgroups of neighboring 3D models in a random selection scheme. Many other selection criteria may be applied.

According to an example of the presently disclosed subject matter, a single 3D camera can be used for generating a series of 3D models over time, tracking an object moving along a trajectory relative to the 3D camera. For convenience, the above scenario is referred to as the trajectory scenario. In the trajectory scenario, the 3D pairing operation can use the order in which the 3D models were generated such that the 3D registration is preformed between pairs and/or subgroups of sequential 3D models. It would be noted, that pairs of sequential 3D models are generated closer in time (compared to non-sequential pairs of 3D models) and can smaller discrepancies between the two models.

In further example, a priori assumptions on the motion, for example assumptions extrapolated from previous registration results, can also be used in the 3D model pairing operation to produce a good initial guess for the pairwise 3D registration algorithm.

A special case of the trajectory scenario is when the 3D registration is performed in an online manner, where 3D registration of available 3D models begins before the entire group of 3D models is generated. From a certain point after the 3D data capturing begins, for example, after two frames are obtained (or three, four, . . . , n frames are obtained, for example after a predefined number of frames are obtained) the 3D registration process is initiated, while the 3D data capturing process continues. For convenience this scenario is referred to herein as the online trajectory scenario.

The parallel 3D registration process, according to examples of the presently disclosed subject matter, can be performed using any system and/or configuration of computing units. For example, if a 3D camera which is generating 3D data that is to undergo 3D registration is attached to a parallel processor, the parallel process can be configured to perform the 3D registration according to examples of the presently disclosed subject matter. Alternatively, the 3D models can be communicated from the 3D camera over a wired or over a wireless channel to a remote parallel computer, where the 3D registration process can be performed. Examples of such a separate parallel computer include a mobile processing device that include several processing cores, a remote computer, a remote parallel computer, a distributed computer, a cloud computing system, and so forth. Another possibility is to divide the processing between a processor that is attached to the 3D camera and a separate (external) processor. For example, some of the 3D registration sub-process can be processed on attached processors, and some of the 3D registration sub-process can be offloaded to external processors.

According to examples of the presently disclosed subject matter, the 3D registration sub-process can be dependent on certain types of information, including for example, information resulting from other or previous 3D registration sub-process. In another example, the initiation of the 3D registration sub-process may not be contingent upon external information availability, and in particular, the initiation of the 3D registration sub-process may not be related to the timing or the progress of other or previous 3D registration sub-process.

According to examples of the presently disclosed subject matter, whenever a processing unit is or becomes available, and there is a subgroup of 3D models that is ready for 3D registration or is ready for repeated 3D registration, a 3D registration task (or a 3D registration sub-process) can be assigned to the available processing unit.

According to examples of the presently disclosed subject matter, the assignment of subgroups to processing units can be done by a centralized process that controls and manages the overall 3D registration process. For example, such centralized process can maintain a list of all subgroups waiting for processing, and a list of all available processing units. Further by the way of example, when both the list of all available processing units and the list of all subgroups waiting for processing are not empty, the process may assign a chosen subgroup from the list of all subgroups to a chosen processing unit from the list of all available processing units, and remove the chosen subgroup and the chosen processor from the lists. As an example, the list of all subgroups waiting for processing may be maintained sorted by priority, the centralized process may chose the subgroup of the highest priority, and the processing unit that best fit the computational needs of the chosen subgroup. As another example, the list of all subgroups waiting for processing and the list of all available processing units may be maintained in a First-in-First-Out order, and the centralized process may choose the longest waiting subgroup and longest available processing unit. As another example, the processing unit may choose a subgroup in random, or according to any other policy.

According to examples of the presently disclosed subject matter, the assignment of subgroups to processing units can be done in a distributed fashion, for example by the processing units which are used for preforming the 3D registration sub-process. For example, a list of all subgroups waiting for processing can be maintained in a shared memory. Further by a way of example, when a processing unit is free it may check the list of all subgroups waiting for processing. If the list is not empty, the processing unit may the processing unit may choose one subgroup from the list, remove the subgroup from the list, and execute a 3D registration algorithm on that subgroup. If the list is not empty, the processing unit may wait until the list becomes not empty. Further by a way of example, when several subgroups are in the list, the processing unit may choose the subgroup with the highest priority, the subgroup that is in the list for the longest time, a random subgroup, or use any other choosing criterion.

According to examples of the presently disclosed subject matter, the priorities by which the subgroups of 3D models and the respective the 3D registration sub-process are to be process can also be set using any desired policy. For example, a random priority can be used to set the priority for the processing of the subgroups of 3D models. As another example, when dealing with the trajectory scenario, the subgroups of 3D models can be sorted for processing according to the time corresponding to earliest 3D model in the subgroup, where subgroups that contain an earlier 3D model is given a higher priority. According to examples of the presently disclosed subject matter, prioritizing subgroups of 3D models for repeated 3D registration, any possible policy can be used, including random prioritization, prioritization according to the time in which the 3D registration sub-process was originally initiated, according to the time in which the original 3D registration sub-process was completed, according to the time the subgroup registration was assigned for repeated 3D registration, and so forth.

According to examples of the presently disclosed subject matter, when a subgroup of 3D models is assigned to a processing unit, an initial guess for the 3D registration of the subgroup of 3D models may be produced using the available results from previously completed 3D registration sub-process and other available a prior information, such as location and/or orientation of the 3D models coming from an additional sensor, an a prior assumptions on the location and/or orientation of the 3D models coming from assumptions on the object motion in real world, and so on. The initial guess may also be a function of a 2D registration result, for example by first applying a 2D registration on 2D projections of the subgroup of 3D models, and then using the 2D registration result to produce an initial guess for the 3D registration sub-process. The initial guess may be an input for the 3D registration sub-process with which this 3D modules subgroup is associated. The initial guess may be computed by the processing unit the subgroup is assigned to, or by a different processing unit.

When the 3D registration sub-process is completed, the processing unit that performed the pairwise 3D registration can be configured to inform other processing units with the resulting transformation. According to examples of the presently disclosed subject matter, the processing unit that performed the pairwise 3D registration can be configured to also inform the other processing unit with regard to a byproduct of the transformation, such as the position and orientation of one or more of the 3D models, the certainty of the 3D registration result, and so forth. The data updates and information sharing can be achieved, for example, through a shared memory, a shared computer bus, a communication network, a communication protocol and so forth.

At some point additional information may become available, for example due to the completion of another 3D registration sub-process, or in an online trajectory scenario, due to the arrival of additional 3D models. At this point, interpolation or extrapolation, for example, can be used to improve upon the initial guess previously used in the 3D registration sub-process the subgroup of 3D models which is to undergo the repeated 3D registration sub-process with the additional information. It is therefore possible to re-evaluate the resulting transformation for this subgroup, and determine whether the registration information for this subgroup of 3D models should be recalculated. If it is determined that the 3D registration sub-process should be repeated, the subgroup of 3D models for 3D registration sub-process that is to be repeated can be marked. According to examples of the presently disclosed subject matter, once a subgroup of 3D models is marked for repeated 3D registration sub-process, a 3D registration sub-process scheduling module, for example implementing the same assignment mechanism described above, can be used. In a further example of the presently disclosed subject matter, a separate module can be used or separate control logic can be used for scheduling repeated 3D registration sub-processes.

As an example, consider the trajectory scenario. Here, new information regarding a subgroup of 3D models can come in the form of:

Transformations for other subgroups of 3D models that preceded (for example, of whose 3D registration sub-process was initiated previously to this subgroup) a current 3D model subgroup. It would be noted that such transformations can include transformations that were not available at the time when the previous 3D registration sub-process for this subgroup started.

Transformations for other subgroups of 3D models that follow this subgroup (for example, of whose 3D registration sub-process was initiated after this subgroup), and therefore were not available at the time the 3D registration process for this subgroup started.

Transformations for other subgroups of 3D models that were available at the time the 3D registration sub-process for this subgroup was initiated, but due to a recalculation the transformations were changed after the 3D registration sub-process for this subgroup was initiated.

Recalculation of transformations of other subgroups of 3D models.

In an online trajectory scenario, additional 3D models become available as the scanning of a scene progresses. This also present new information that can be used to reevaluate the 3D registration result of 3D registration sub-processes that were initiated before this information became available.

According to examples of the presently disclosed subject matter, one possibility for reevaluating a 3D registration result is to recalculate a new initial guess for the corresponding subgroup of 3D models when new information is available. Then, the difference between the original initial guess and the resulting transformation can be compared with the difference between the new initial guess and the resulting transformation can be examined. If the difference increases, and the increase is above some threshold, (or alternatively, if the ratio between the new to original differences is above some threshold), the subgroup of 3D models can be marked for a repeated 3D registration sub-process.

Another possibility for reevaluating a 3D registration result is to look at the positions where the original initial guesses would place the central mass of a 3D model ("the original position"), the position where the new initial guess will place the central mass of the 3D model ("the new position"), and the position the 3D registration result will position the 3D model ("the resulting position"). Then, the difference between the original position and the resulting position can be compared with the difference between the new position and the resulting position can be examined. If the difference increases, and the increase is above some threshold, (or alternatively, if the ratio between the new to original differences is above some threshold), the subgroup of 3D models can be marked for a repeated 3D registration sub-process.

When dealing with the trajectory scenario, another possibility for reevaluating a 3D registration result when new information arrives is to examine the trajectory resulting from the 3D registration result and the new information. If the trajectory does not fit with an a priori knowledge about the motion of the object, or if one or more of the 3D models seems to cause an irregularity in the trajectory, the subgroup of 3D models corresponding to the 3D registration result can be marked for a repeated 3D registration. Many other alternatives for reevaluating a 3D registration result are also possible.

In some cases, the plurality of 3D registration results obtained from the atomic 3D registration sub-process may be conflicting and contain inconsistencies. In such cases, a relaxation step can be implemented. There are numerous algorithms for relaxation of conflicting 3D registration results which can be used in examples of the presently disclosed subject matter. For example, when dealing with a group of n 3D models, having n or more pairwise transformations, where each transformation is from one 3D model to another 3D model, a conflict can occur with regard to the location of some parts of one or more of the 3D models. One way to produce a consistent global 3D registration result is by dropping few of the pairwise transformations until what remains are n−1 transformations that connect all the n 3D models. This assures that there are no conflicts, and therefore a consistent global 3D registration result is achieved. Different alternatives include the usage of the GraphSLAM algorithm, usage of the relaxation process of the Multiview Registration for Large Data Sets algorithm, and so forth.

Figure 5:
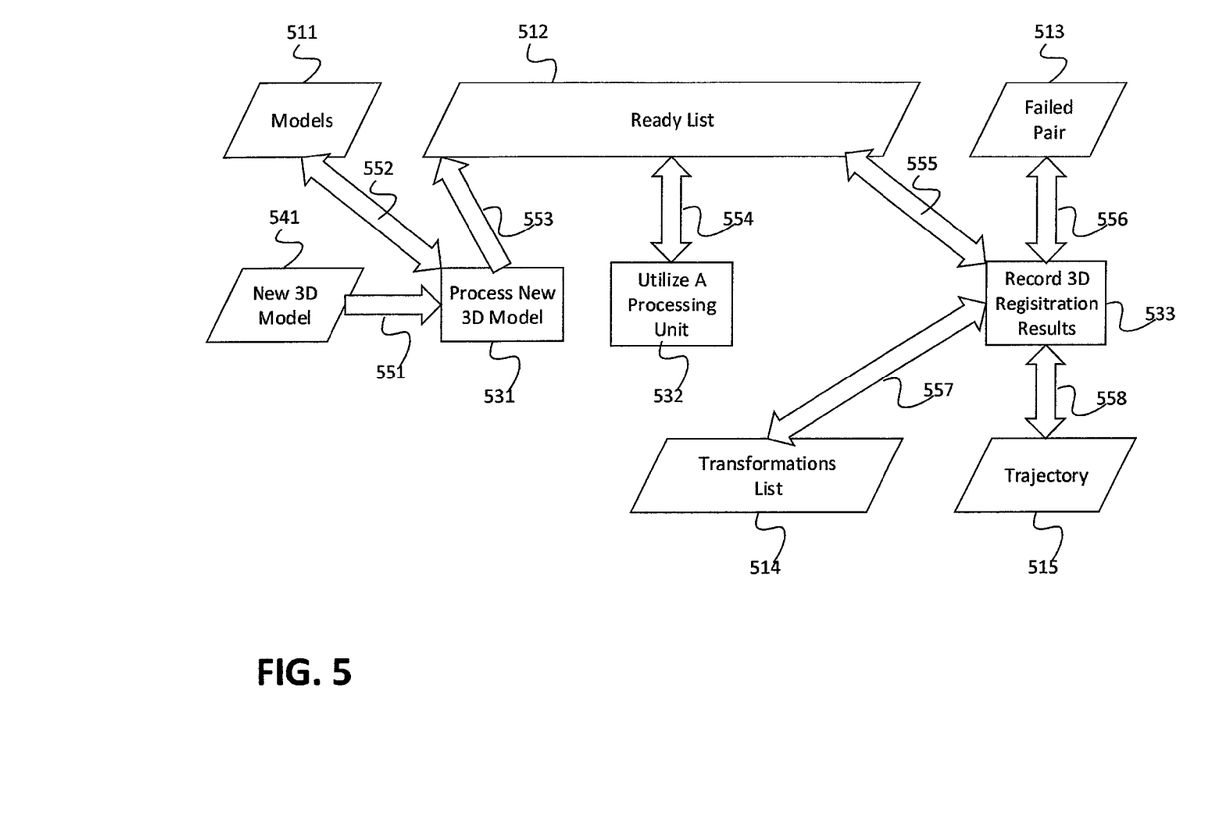
FIG. 5 is an illustration of a possible data flow of a possible implementation for one particular scenario.

There is now provided one possible realization of the above algorithm for the online trajectory scenario. In this example a central process is used for scheduling the 3D registration sub-processes, and this central process also calculates the initial guess and reexamines previous results when new information becomes available. The data flow of this example is illustrated in FIG. 5, and a flow chart for this example is given in FIG. 6.

Data structure:
- ready_list (512 in FIG. 5)—a list of pairs of 3D models ready for 3D registration. Initialized as empty.
- trajectory (515 in FIG. 5)—an estimation of the object trajectory. May be initialized using prior information.
- transformations (514 in FIG. 5)—a list of all pairs of 3D models for which a transformation was successfully calculated, together with the calculated transformation.
- models (511 in FIG. 5)—an array of 3D models sorted by time of generation. Initialized as empty.
- failed_pair (513 in FIG. 5)—a pair of 3D models. Initialized as empty.

Figure 6:
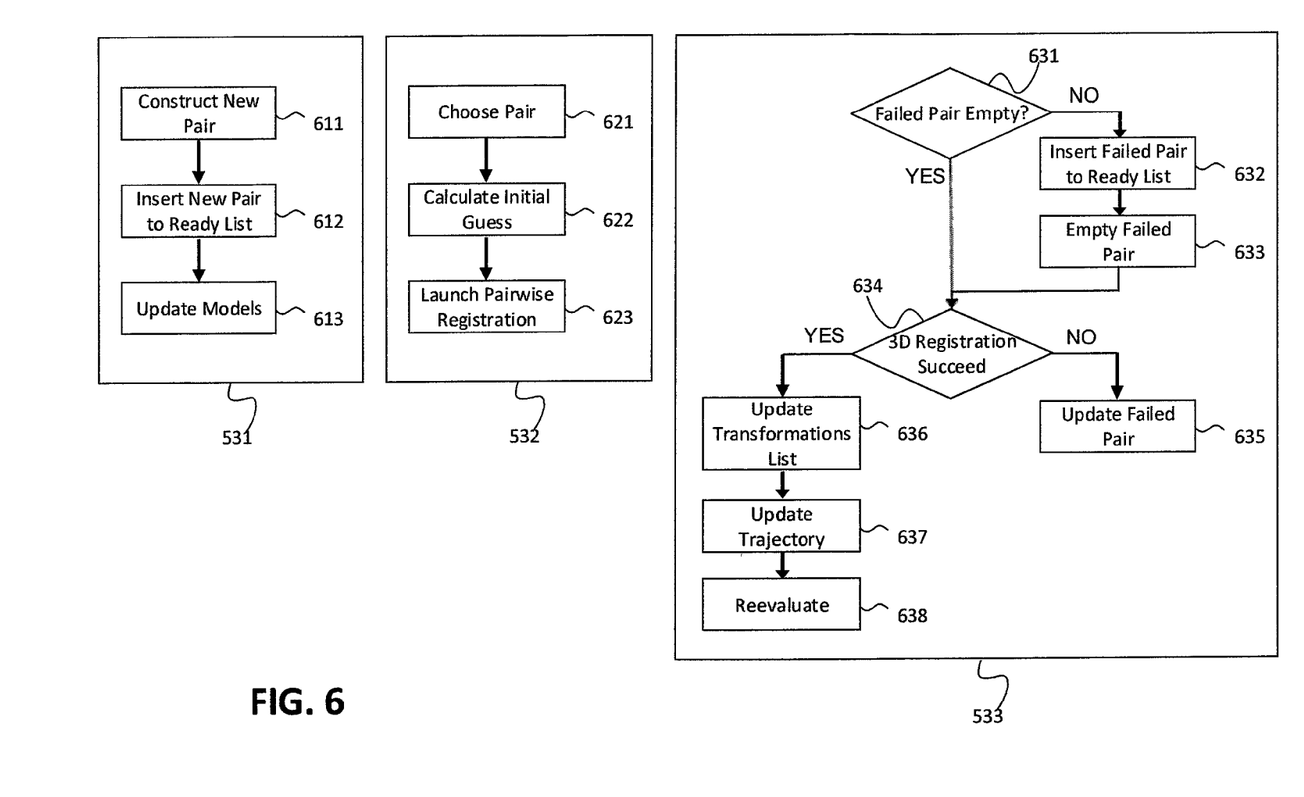
FIG. 6 is an illustration of a possible flow chart of a possible implementation for one particular scenario.

Processing rules:
- Process 531 is activated whenever a new 3D model (541 in FIG. 5) is generated:
  - Operation 611 constructs a new pair of 3D models from the last 3D model in the models array and the new 3D model.
  - Operation 612 inserts the new pair to the ready_list.
  - Operation 613 inset the new 3D model to the end of the models array.
- Process 532 is activated whenever a processing unit is free and the ready_list is not empty:
  - Operation 621 chooses a pair of 3D models out of the ready_list.
  - Operation 622 calculates an initial guess for the chosen pair.
  - Operation 623 launches a pairwise 3D registration process of the chosen pair using the calculated initial guess on the free processing unit.
- Process 533 is activated whenever a pairwise 3D registration process is completed:
  - Condition 631 checks if failed_pair is empty. If it is not empty:
    - Operation 632 inserts failed_pair into the ready_list.
    - Operation 633 sets failed_pair to be empty.
  - Condition 634 checks if the pairwise 3D registration succeeded. If the pairwise 3D registration process failed:
    - Operation 635 sets failed_pair to the pair of 3D models that were processed.
  - If the pairwise 3D registration process succeeded:
    - Operation 636 updates the transformations list as follows:
      - Receive the resulting transformation for the process which was complete.
      - If the 3D models pair is already in the transformations list: Update the transformation for this 3D models pair in the transformations list to be the resulting transformation.
      - If the 3D models pair is not in the transformations list: Insert the 3D models pair to the transformations list together with the resulting transformation.
    - Operation 637 updates trajectory accordingly.
    - Operation 638 reevaluates all 3D models pairs in the transformations list that are not in the ready_list; inserting all pairs that failed the reevaluation into the ready_list.

When a processing unit is assigned a subgroup of 3D models for 3D registration sub-process, the subgroup of 3D models can receive the information associated with the respective 3D models, and an initial guess. Alternatively, the processing unit can calculate the initial guess. After completion of the 3D registration sub-process, the processing unit can be configured to provide the resulting transformation to the central process, or to inform the central unit on the failure of the 3D registration sub-process, as appropriate.

In a further aspect, the above scheme can also be applied to 2D registration. Here, the models are 2D models. The plurality of 2D models is obtained. The 2D models can be produce from a projection of 3D models into 2D, from 2D images, from frames of 2D video, and so on. Subgroups of the plurality of 2D models are selected. The atomic sub-problem is a pairwise 2D registration or 2D registration for a subgroup of the plurality of 2D models. The atomic sub problems are assigned to a plurality of computational units, and are executed in parallel. The results of the atomic sub-problem can be evaluated according to new information and/or to other results of other atomic sub-problems, and some subgroups can be assigned for repeated 2D registration. The results of the atomic sub-problems can be combined into a global 2D registration using a relaxation step. The atomic sub-problem can treat any size of subgroup of the 2D models, performing registration on any number of models, including more than two models at a time. As an implementation example, the above parallel computing scheme can be applied recursively, where sub-problems that deal with more than two models, is solved by applying the same parallel computing scheme on that subgroups. Alternatively, sequential algorithms can be used to address the problem of registration of more than two models directly.

In a further aspect, the same subgroup can be subject to processing in more than a single atomic 3D registration sub-process, each time using a different algorithm to solve the atomic sub-problem and/or a different initial guess, compare the plurality of results and choose one of them. Alternatively, the plurality of results can be used in combination to produce a new 3D registration result. Alternatively, the entire plurality of results can be used as input to a single relaxation process that deals with additional subgroups simultaneously.

It will also be understood that the system according to the invention may be a suitably programmed computer, the computer including at least a processing unit and a memory unit. For example, the computer program can be loaded onto the memory unit and can be executed by the processing unit. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A method of generating a 3D model from a plurality of sets of acquired 3D points, comprising:
   - receiving the plurality of sets of acquired 3D points corresponding to a surface of an object present within a scene that was 3D scanned or imaged, wherein each set is generated during an exposure of a 3D scan or captured process for a portion of the scene;
   - responsive to an instruction to perform 3D registration of at least some of the plurality of sets of 3D points within the scene, aligning the plurality of sets with a reference coordinate frame of the scene, wherein aligning includes iteratively performing spatial rotations and spatial translations of at least one set of acquired 3D points within the reference coordinate frame and using one or more computing units;

wherein iteratively performing spatial rotations and spatial translations of at least one set of acquired 3D points on one or more computing units comprises:
grouping two or more sets of 3D points based on estimated proximity within the scene reference coordinate frame;
applying a 3D registration algorithm to the grouped sets of 3D points such that points of the sets are aligned and merged within a context of the scene reference coordinate frame;
checking a 3D registration result for the grouped sets of 3D points;
iteratively repeating the 3D registration algorithm on the grouped sets of 3D points until a checked result of the checking indicated a sufficiently accurate registration; and
in parallel grouping and applying a registration algorithm to other sets of 3D points in order to produce larger sets of points which are subsequently combined to obtain a global 3D registration result for all of the plurality of sets of 3D points.

2. The method of claim 1, wherein the grouping of sets of 3D points includes is at least three sets of 3D points.

3. The method of claim 1, wherein the 3D registration algorithm is a pairwise 3D registration algorithm.

4. The method of claim 3, wherein the sets 3D points are in the form of point clouds, and the pairwise 3D registration algorithm is a iterative closest point algorithm.

5. The method of claim 1, further comprising: applying relaxation to the plurality of 3D registration results to thereby obtain a consistent global 3D registration result of the plurality of 3D models.

6. The method of claim 1, wherein the set of 3D points is provided to the computing unit by an external source.

7. The method of claim 6, wherein the external source is a single central process unique in the system.

8. The method of claim 1, wherein grouping of the sets comprises selection of two or more sets with points estimated to be in spatial proximity with one another.

9. The method of claim 1, wherein further comprises: obtaining an initial guess for the 3D registration.

10. The method of claim 9, wherein the initial guess is provided by an external source.

11. The method of claim 10, wherein the external source is a single central process unique in the system.

12. The method of claim 1, further comprising calculating an initial guess for the 3D registration.

13. The method of claim 9, wherein the initial guess is computed based on one or more 3D registration result from previously completed computational task.

14. The method of claim 1, further comprising:
obtaining a first group of 3D registration results from a merging of a first group of sets of 3D points;
obtaining a second group of 3D registration results from a merging of a second group of sets of 3D points;
evaluating the first group of 3D registration results based on the second group of 3D registration results; and
repeating a 3D registration based on the results of the first group evaluation.

15. The method of claim 14, wherein the computational tasks corresponding to the first group of sets of 3D points are launched before the completion of the computational tasks corresponding to the second group of sets of 3D points.

16. A software product stored on a non-transitory computer readable medium and comprising data and computer implementable instructions for carrying out the method of claim 1.

17. An apparatus, comprising:
at least one 3D camera, configured to capture a plurality of sets of 3D points;
a plurality of computing units, each configured to:
group two or more sets of 3D points based on estimated proximity within the scene reference coordinate frame;
apply a 3D registration algorithm to the grouped sets of 3D points such that points of the sets are aligned and merged within a context of the scene reference coordinate frame;
check a 3D registration result for the grouped sets of 3D points;
iteratively repeat the 3D registration algorithm on the grouped sets of 3D points until a checked result of the checking indicated a sufficiently accurate registration;
and
an additional computing unit configured to in parallel group and apply a registration algorithm to other sets of 3D points in order to produce larger sets of points which are subsequently combined to obtain a global 3D registration result for all of the plurality of sets of 3D points.

18. The apparatus of claim 17, wherein the at least one 3D camera is exactly one 3D camera.

19. The apparatus of claim 17, wherein the at least one 3D camera is at least two 3D cameras.

20. The apparatus of claim 17, wherein the plurality of 3D models is at least three 3D models.

21. The apparatus of claim 17, wherein the sets of 3D points comprise exactly two sets, and the 3D registration algorithm is a pairwise 3D registration algorithm.

22. The apparatus of claim 21, wherein the sets of 3D points are in the form of point clouds, and the pairwise 3D registration algorithm is the iterative closest point algorithm.

23. The apparatus of claim 17, wherein the additional computing unit is further configured to apply relaxation to the plurality of 3D registration results to thereby obtain a consistent global 3D registration result of the plurality of 3D models.

24. The apparatus of claim 17, further comprising:
a second additional computing unit configured to assign sets of 3D points to at least one of the plurality of computing units.

25. The apparatus of claim 17, wherein each of the plurality of computing units is further configured to obtain an initial guess for the 3D registration.

26. The apparatus of claim 25, wherein the initial guess is computed based on one or more 3D registration results from previously completed executions of the 3D registration algorithm.

* * * * *